Patented Jan. 16, 1945

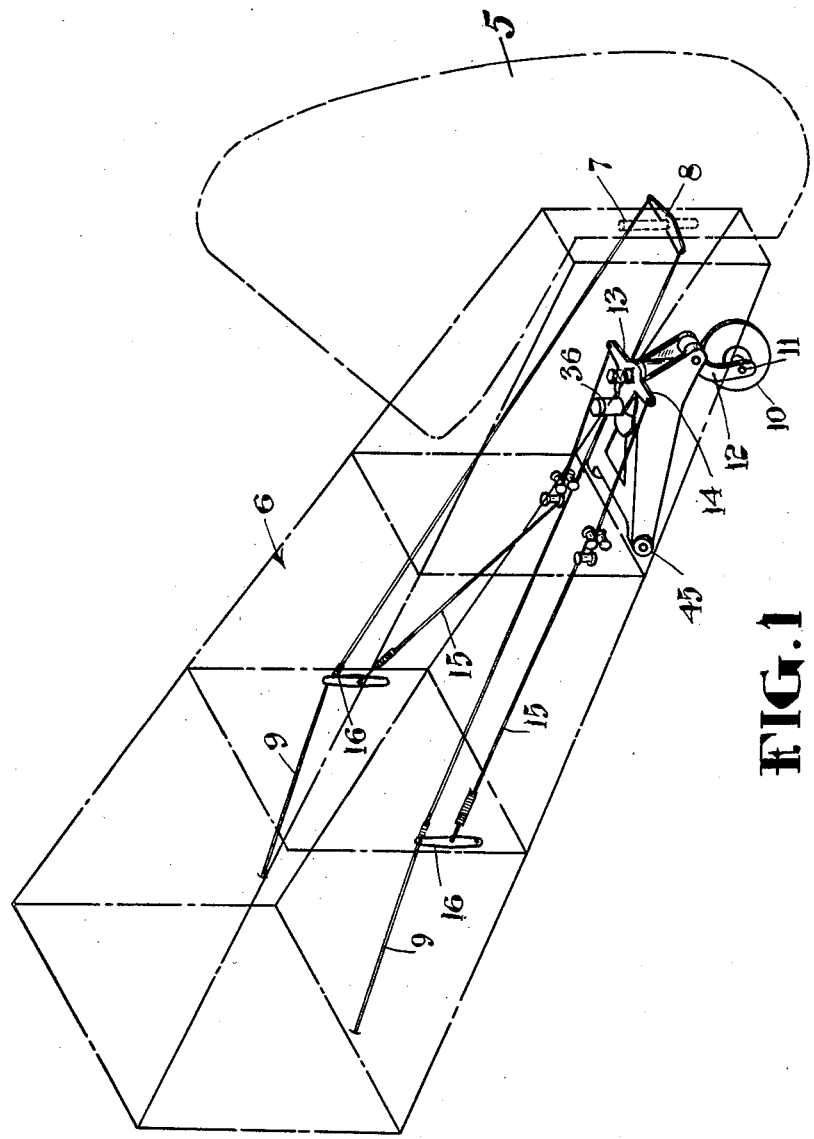

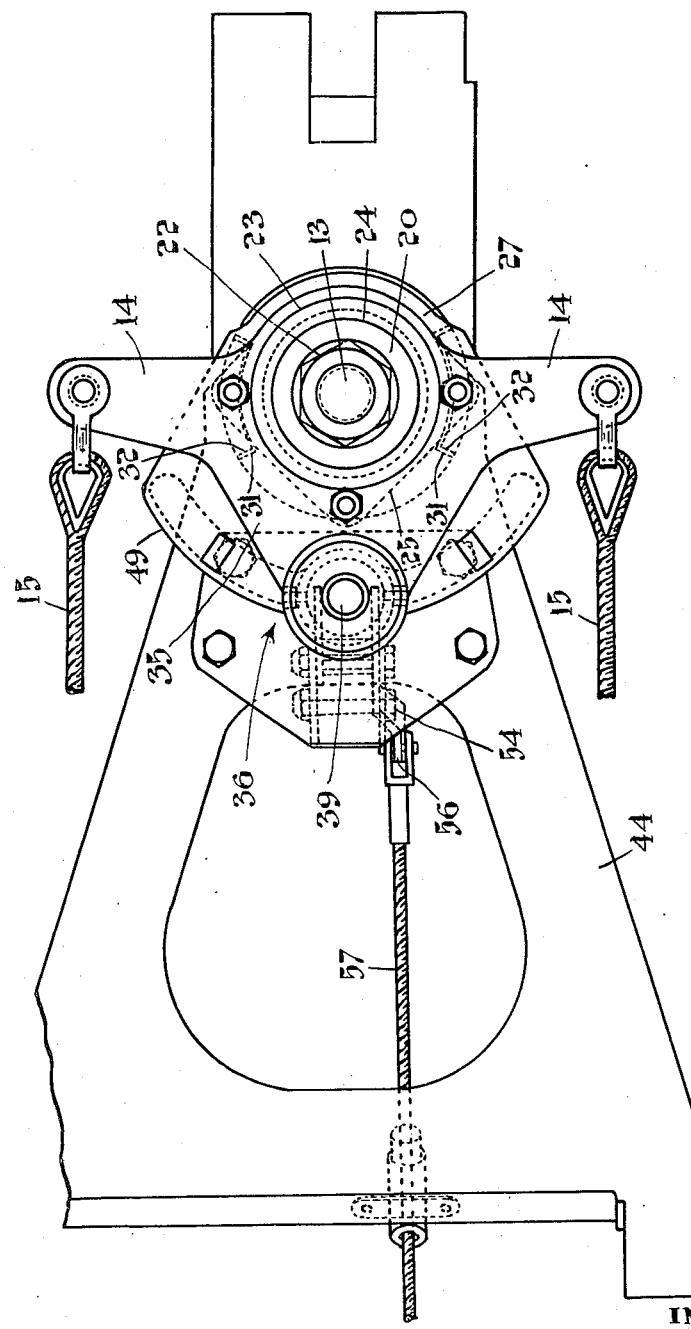

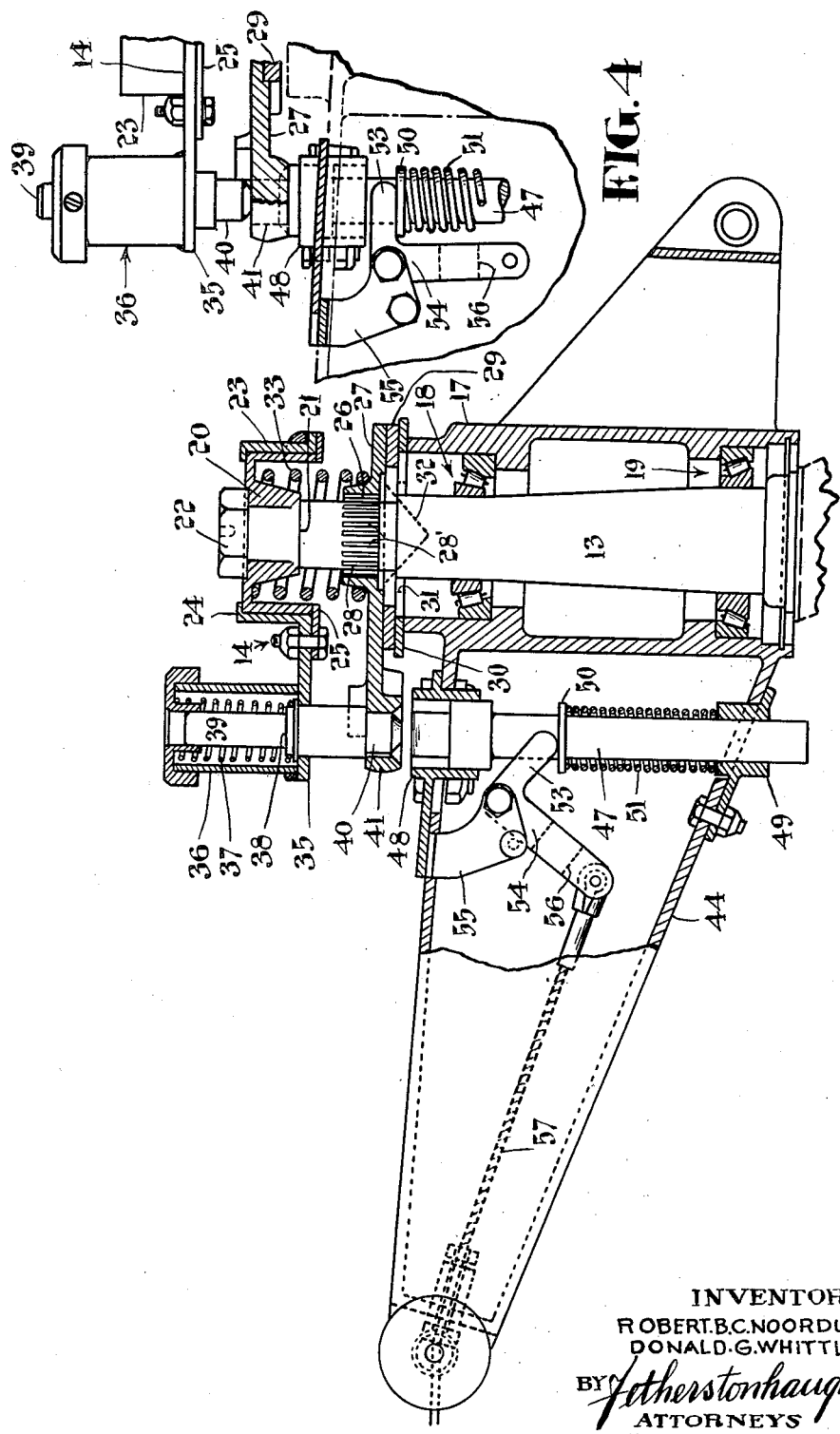

2,367,649

UNITED STATES PATENT OFFICE 2,367,649

RUDDER AND GROUND WHEEL CONTROL MECHANISM FOR AIRCRAFT

Robert B. C. Noorduyn and Donald G. Whittle, Montreal, Quebec, Canada

Application March 11, 1942, Serial No. 434,196
In Canada February 24, 1942

5 Claims. (Cl. 244—50)

This invention relates to a combined air rudder and ground wheel control mechanism for aircraft.

The principal object is to provide a mechanism in which an air rudder and a ground wheel are normally interconnected for simultaneous operation by pilot actuated steering means, said mechanism also including pilot actuated means for locking the ground wheel in a given position and simultaneously releasing the air rudder for independent operation by the pilot actuated steering means. The ground wheel which is controlled in accordance with this invention may be either the nose wheel or the tail wheel of the aircraft.

According to the preferred embodiment of this invention, the steering spindle of the ground wheel and the steering post of an air rudder are normally interconnected for simultaneous operation by a suitable pilot actuated steering means, the connection between the steering means and the wheel spindle being of a releasable nature. A pilot actuated locking device is also provided for locking the spindle of the ground wheel in a fixed position which is preferably a central position tending to steer the aircraft along a straight course. The spindle locking device is constructed and arranged so that the operation thereof to a spindle locking position automatically releases the connection between the spindle and the pilot actuated steering means so that the latter may be used for operating the air rudder independent of the ground wheel.

Another feature of the invention consists in constructing and arranging the component parts of the control mechanism so that they may be readily reset to restore the mechanism to its original condition in which the ground wheel and the air rudder are interconnected for simultaneous operation.

Other objects, advantages and characteristic features of the invention will be more readily understood from the following detailed description taken in connection with the accompanying drawings, in which Fig. 1 is a perspective view of my invention and illustrates the application thereof to an aircraft.

Fig. 2 is a top plan view of the landing wheel assembly and associated parts of the pilot operated steering means.

Fig. 3 is a view, partly in side elevation and partly in vertical section, of the assembly shown in Fig. 2.

Fig. 4 is a fragmentary detail view showing certain elements of the tail wheel assembly in different positions as compared with the positions shown in Fig. 3.

Referring to Fig. 1, 5 designates an air rudder and 6 a part of the fuselage of an aircraft to which my invention is applied. The rudder post 7 is provided with the usual steering lever 8, the ends of which are connected by cables 9 to remote steering controls (not shown) located within convenient reach of the pilot. The tail wheel of the aircraft is indicated at 10 and is shown mounted on an axle 11 supported by a wheel knuckle 12 provided at the lower end of a rotatably mounted steering spindle 13. A steering lever 14 is rotatably mounted on the steering spindle 13 and has its opposite ends connected by cables 15 and levers 16 to the previously mentioned steering cables 9.

Spindle 13 (compare Figs. 1 to 3 inclusive) extends upwardly through a housing 17 in which it is rotatably journalled by means of suitable upper and lower anti-friction bearings 18 and 19. The upper end of spindle 13 is reduced to receive a cap member 20 which is clamped against the spindle shoulder 21 by a clamping nut 22. The spindle carried lever 14 is provided with a central bearing hub 23 in which the skirt portion of the cap member 20 is a rotatable fit, relative vertical movement between the lever and the cap member being prevented by reason of the fact that the cap is confined between a flange 24 provided at the upper end of the lever hub 23 and a retaining plate 25 which is bolted to the lever so that its inner edge underlies the skirt portion of the cap member. The spindle 13 also extends through a shaft receiving opening 26 provided in a plate 27 which is arranged between the cap member 20 and the upper end of the housing 17. Plate 27 is slidable vertically with reference to spindle 13 and the wall of the plate opening 26 is provided with splines 28 which are engaged with similar splines 28' on the spindle 13 when the plate 27 is in its lowermost position as shown in Fig. 3. In this position of plate 27 a friction disk 29, carried by the underside of the plate, is pressed against a centrally apertured disk 30 which is secured to the upper end of housing 17. Opposite marginal portions of disk 30 are notched as at 31 to accommodate V-shaped cam members 32 which extend downwardly from plate 27. A coil spring 33 is confined in compression between the top of the cap member 20 and the upper surface of plate 27 and normally serves to hold said plate in the position shown in Fig. 3.

An extension 35 of lever 14 carries a spring housing 36 containing a spring 37 arranged to exert downward pressure against the shoulder 38 of a locking pin 39 which is slidably mounted by said housing. The lower end of pin 39 is reduced to provide a tip portion 40 which is normally engaged in a hole 41 provided in plate 27. As will be readily understood the engagement of the tip portion 40 of pin 39 in the hole 41 of plate 27 locks lever 14 against turning movement relative to spindle 13. As long as this locking connection between the lever 14 and the plate 27 is maintained the spindle 13 may be operated simultaneously with the air rudder 5 whenever the pilot actuates the steering means represented by the cables 9 and 15 and the cable connecting levers 16. In this connection it will be noted that any turning movement imparted to the lever 14 will be transmitted to the spindle 13 through the pin 39, plate 27 and the splines 28 and 28'. The spindle housing 17 is here shown as constituting an integral part of a wheel carrying structure 44, the forward end of which is secured to the fuselage 6 by any suitable pivotal connection such as indicated at 45 in Fig. 1. The rear end of the structure 44 is connected in the usual manner to the lower end of a conventional shock absorber (not shown).

A vertically movable locking pin 47 is arranged to slide in upper and lower guides 48 and 49 carried by the supporting structure 44. This pin 47 is provided with a collar 50 and is normally urged upwardly by a spring 51 which is confined between said collar and the lower guide 49. Pin 47 is normally held in the lower position shown in Fig. 3 by means of the arm 53 of a bell crank lever 54 which is pivoted to a suitable bracket 55 carried by the structure 44. The remaining arm 56 of lever 54 is connected by an operating cable 57 to a suitable pilot actuated control (not shown).

The purpose of the locking pin 47 is to lock plate 27 and spindle 13 against turning movement relative to housing 17 and to simultaneously release the pin connection between plate 27 and steering lever 14. This is accomplished by turning the lever 14 to a position such that the pin receiving opening 41 of plate 27 is positioned directly above the upper end of the pin 47. The cable 57 is then released or slackened by the pilot so that the arm 53 of bell crank lever 54 will swing upwardly to permit the spring 51 to project the upper end of pin 47 into the hole 41 of plate 27 and to thus lock the plate 27 and the spindle 13 against turning movement relative to the housing 17. As the upper end of pin 47 is projected into hole 41 it forces the lower or tip end of pin 39 out of said hole, as shown in Fig. 4, and thus releases the driving connection between plate 27 and lever 14. This enables the pilot to operate the rudder 5 independently of the spindle 13 since, under these conditions, lever 14 will turn freely on the cap member 20 and the lower end of pin 39 will ride the upper surface of plate 27.

The parts of the mechanism are preferably arranged so that, when the spindle 13 is locked against turning movement, the ground or tail wheel 10 will be in its central position in which it tends to force the aircraft to run straight on the ground.

When it is desired to release spindle 13 and to re-establish the driving connection between the plate 27 and lever 14 this is accomplished by pulling the cable 57 so that, through the agency of the bell crank lever 54, the pin 47 is returned to the spindle releasing position shown in Fig. 3, in which the upper end of pin 47 is withdrawn from the hole 41. The pilot then operates the cables 15 to turn the lever 14 to the position necessary to bring the tip end of the pin 39 over the hole 41. When this is done the spring 37 forces the tip end 40 of pin 39 to re-enter the hole 41 and to re-establish the driving connection between lever 14 and plate 27. When the parts are in the position shown in Figs. 2 and 3 the angle through which the tail wheel spindle 13 may be turned by operation of lever 14 is determined by the play of the V-shaped cams 32 in the notches 31 of disk 30. As a general rule the play of the cams 32 in the notches 31 is such as to permit the spindle 13 to be turned through an angle of approximately 60°. There are times, however, when it is desired to permit the spindle 13 to be turned through a greater angle independently of lever 14. This is provided for by the present invention since, when the cams 32 strike the ends of the notches 31 during rotation of the plate 27 in one direction, continued rotation of plate 27 in the same direction will cause the cams to ride out of the notches and onto the upper surface of disk 30. The plate 27 is thus raised so that the splines 28 thereof are elevated above and out of engagement with the spindle splines 28' so that the spindle is thus released to permit free swivelling movement of the tail wheel.

Having thus described what I now conceive to be the preferred embodiment of this invention it will be understood that various modifications may be resorted to within the scope and spirit of the appended claims. For example, the assembly of the wheel locking pin 47 and the spring 51 may be modified so that the spring acts to urge said pin to an inoperative or wheel releasing position. In this case the cable 57 would be replaced by some form of compression device such as a push-pull control or a hydraulic control operable by the pilot to project the pin 47 to its operative or wheel locking position.

Having thus described our invention, what we claim is:

1. A combined air rudder and ground wheel controlling mechanism for aircraft comprising a ground wheel provided with a steering spindle, means rotatably mounting said spindle, a steering lever rotatably mounted on said spindle for turning movement relative thereto, pilot actuated steering means connected to said steering lever and to said rudder to provide for simultaneous operation thereof by the pilot, releasable means normally holding said lever against turning movement independently of said spindle and pilot actuated means operable to lock said spindle against rotation and to simultaneously release the aforesaid releasable means by which the steering lever of the spindle is normally held against turning movement independently of said spindle.

2. A landing wheel assembly for aircraft comprising a landing wheel equipped with a steering spindle, means rotatably supporting said spindle, a plate member rotatable with said spindle and having a pin receiving opening formed therein, a steering lever mounted on said spindle so as to be normally free to turn independently of said spindle, a retractable locking pin carried by said lever and adapted to be engaged in the pin receiving opening of said plate to releasably secure said lever against turning movement independently of said spindle and means for locking said spindle against turning movement and simultaneously forcing said pin out of said opening to thereby free said lever for turning movement independently of said spindle.

3. A landing wheel assembly as set forth in claim 2 in which the last mentioned means comprises a pilot actuated spindle locking pin adapted to be projected from a normally retracted or inoperative position to an operative position in which an end of said spindle locking pin is projected into the aforesaid opening of said plate to force the first mentioned lever-locking pin out of said opening and bearings in which said spindle locking pin is mounted, the engagement of the end of said pin in the opening of said plate serving to lock both the plate and the spindle against rotation.

4. A landing wheel assembly for aircraft comprising a steerable ground wheel equipped with a steering spindle, means rotatably mounting said spindle, a plate through which said spindle extends, said plate being movable longitudinally of the spindle from a spindle driving position to a spindle releasing position, the plate and the spindle being provided with complementary members which are engaged to establish a drive connection therebetween in the spindle driving position of the plate and are disengaged to disrupt said driving connection in the spindle releasing position of the plate, resilient means normally biasing said plate to its spindle driving position, a steering lever rotatably mounted on said spindle, a retractable pin carried by said lever and normally engaged in an opening in said plate to establish a releasable drive connection between the lever and the plate and means engageable with said plate, when the latter is in its spindle driving position, to lock said plate and said spindle against turning movement, said last mentioned means serving, when moved to its plate locking position, to force said pin out of the aforesaid opening in the plate to thereby release the driving connection between the plate and the steering lever and means operable, under certain conditions, to automatically move said plate to its spindle releasing position against the resistance of said resilient biasing means.

5. A ground wheel assembly for aircraft comprising a supporting structure including a spindle housing, a ground wheel equipped with a steering spindle extending upwardly through said housing and rotatably mounted therein, a steering lever positioned above said housing and rotatably mounted on the upper end of the spindle so as to be capable of turning movement relative to said spindle, a plate slidably mounted on the spindle between the steering lever and the housing and normally resting on said housing, a spring interposed between said lever and said plate and normally serving to hold the plate in the lowered position in which the plate is supported on the upper end of the housing, said plate and spindle being provided with splines which are engaged to establish a driving connection therebetween when the plate is in its lowered position and which are disengaged to disrupt said driving connection with the plate is raised to a spindle releasing position against the resistance of said spring, a retractable spring projected pin carried by said lever and normally engaged in an opening in said plate whereby said lever, said plate and said spindle are locked against independent turning movement when the plate is in its lowered or spindle driving position, a second pin slidably mounted in bearings carried by said supporting structure, a spring adapted to project said second pin into the opening of said plate and to displace the first mentioned pin from said opening when the latter is aligned with one of the bearings of the second pin and when the second pin is free to move under the influence of its projecting spring and releasable pilot actuated means normally holding said second pin in a retracted position against the resistance of its projecting spring.

ROBERT B. C. NOORDUYN.
DONALD G. WHITTLE.